F. MÜLLER.
METHOD OF MAKING MILLING CUTTERS.
APPLICATION FILED SEPT. 27, 1919. RENEWED JULY 5, 1921.

1,429,613.

Patented Sept. 19, 1922.

Inventor
Friedrich Müller
By S. Jay Teller
Attorney

Inventor
Friedrich Müller
By S. Jay Teller
Attorney

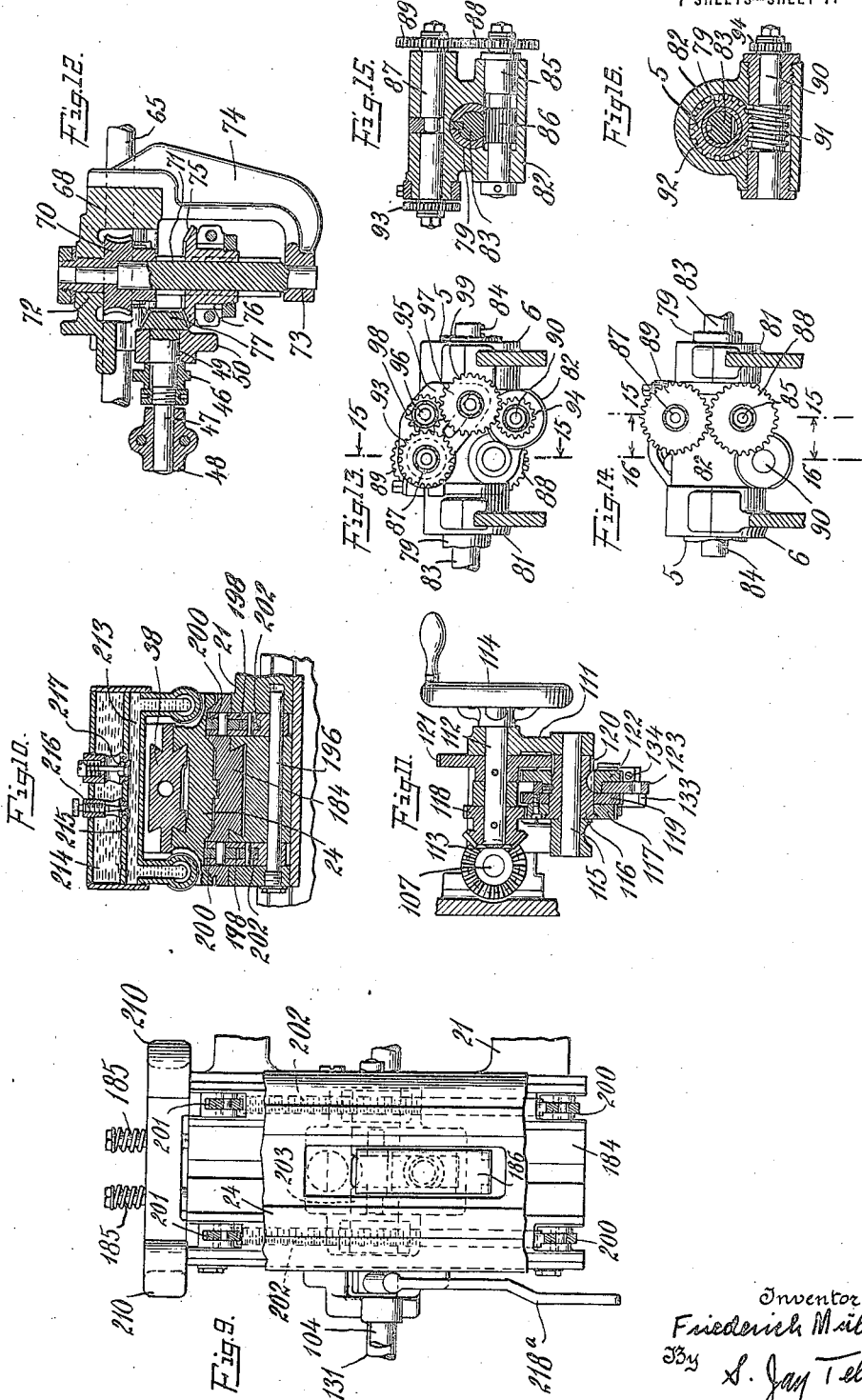

Patented Sept. 19, 1922.

1,429,613

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

METHOD OF MAKING MILLING CUTTERS.

Original application filed March 31, 1919, Serial No. 286,524. Divided and this application filed September 27, 1919, Serial No. 326,875. Renewed July 5, 1921. Serial No. 462,558.

*To all whom it may concern:*

Be it known that I, FRIEDERICH MÜLLER, a citizen of the United States, residing at Hartford, in the county of Hartford and State of Connecticut, have invented certain new and useful Improvements in Methods of Making Milling Cutters, of which the following is a specification.

In accordance with my present invention, I provide a method which is in many respects similar to that set forth in my patent or methods of making milling cutters, No. 1,348,301, dated August 3, 1920. In accordance with the method set forth in the said application, a milling cutter may be made with any predetermined contour so as to have a varying diameter and with helicoidal cutting faces, the contour being formed by means of a narrow cutting tool which is guided by means of a former having the said predetermined contour.

One of the objects of this invention is to provide for the intermittent or step-by-step feeding of the cutting tool along the contour and the withdrawal thereof at the time of each feeding movement. Other objects of the invention will be fully apparent from the following specification and claims.

For practicing the method use may be made of a machine such as that disclosed in my copending application for relieving machines, Serial No. 286,524, filed March 31, 1919. As concerns a number of the broader phases of the invention, use may be made of the machine disclosed in my copending application Serial No. 201,338, filed November 10, 1917. This present application constitutes a division of my aforesaid application, Serial No. 286,524, and as concerns a part of its subject-matter is a continuation of my aforesaid application, Serial No. 201,338.

In the accompanying drawings I have shown a machine for practicing the method, this machine being the same as that shown in my aforesaid application, Serial No. 286,524. It will be understood, however, that the drawings are for illustrative purposes only, and are not to be construed as defining or limiting the scope of the invention, the accompanying claims being relied upon for that purpose.

Of the drawings:

Fig. 9 is a fragmentary plan view showing certain parts of the tool-carrying slides.

Fig. 10 is a fragmentary vertical longitudinal sectional view taken along the lines 10—10 of Figs. 2 and 7.

Fig. 11 is a fragmentary vertical transverse sectional view taken along the lines 11—11 of Figs. 1 and 2.

Fig. 12 is a horizontal longitudinal sectional view taken along the lines 12—12 of Figs. 1 and 7.

Figs. 13 and 14 are detailed views of the mechanism for varying the movement of the blank-carrying spindle, the views being taken from opposite sides.

Fig. 15 is a transverse sectional view taken along the lines 15—15 of Figs. 13 and 14.

Fig. 16 is a fragmentary transvere sectional view taken along the line 16—16 of Fig. 14.

Figure 1:
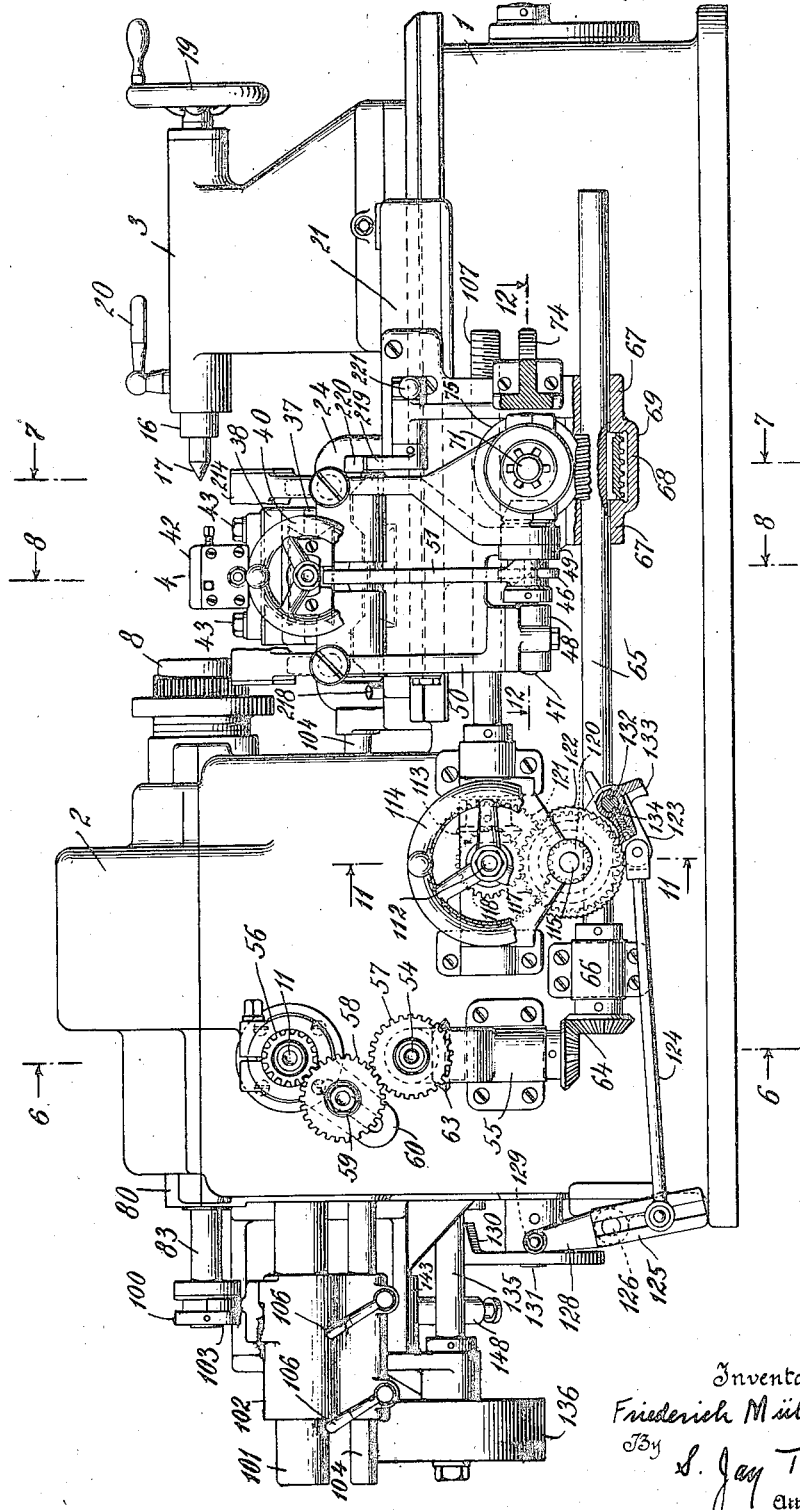
Figure 1 is a front view with certain parts broken away and others shown in section.
Figure 2:
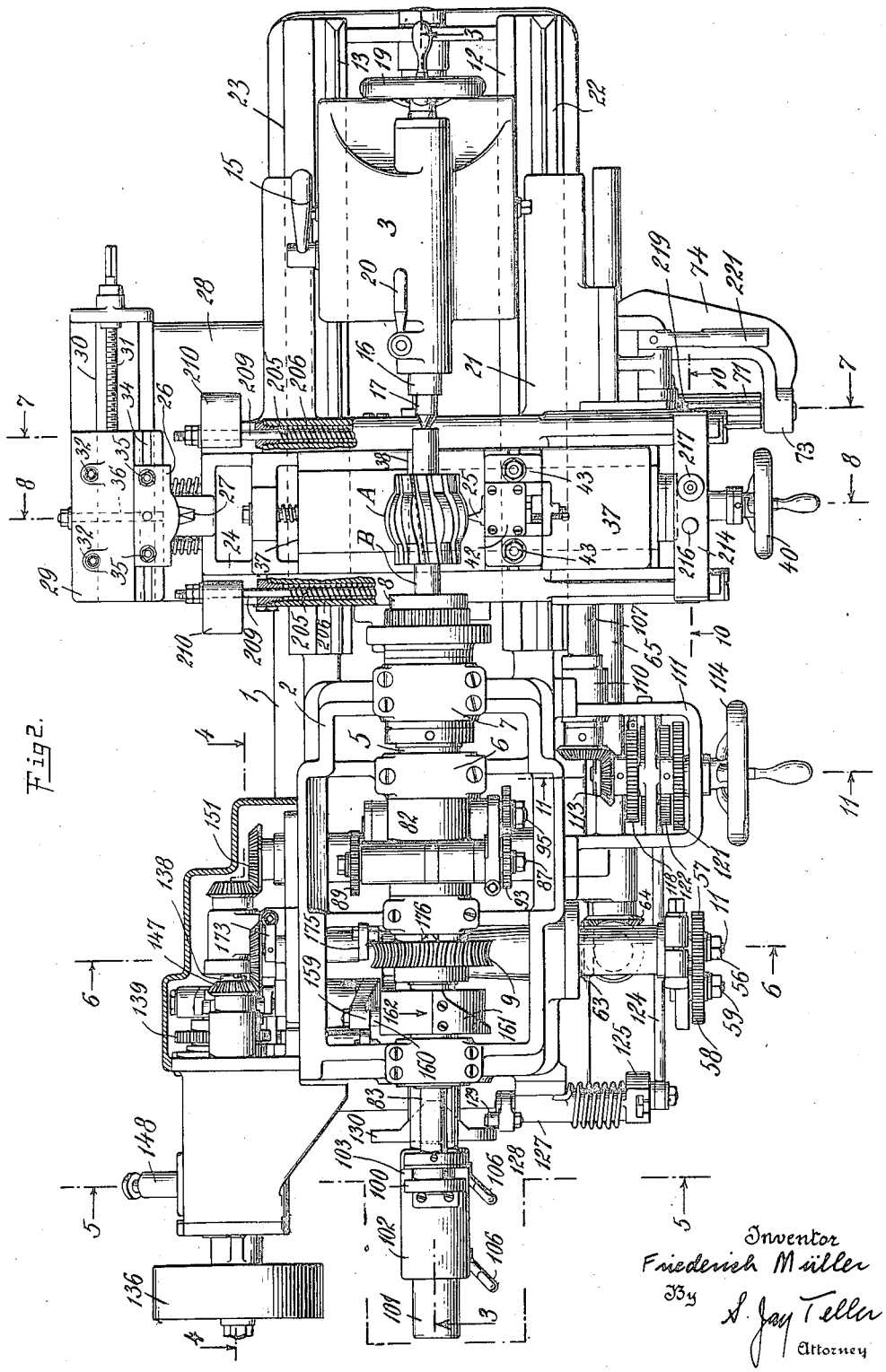
Fig. 2 is a plan view with certain parts shown in section. In this view the covers for the headstock and other gearing are removed for the sake of clearness.

Referring to the drawings, 1 represents the main frame or bed upon which the other parts of the machine are mounted. For carrying the blank for the tool to be formed and relieved, there is provided a headstock 2 and preferably also a tailstock 3. A tool holding-and-operating mechanism is provided, as shown at 4. Preferably the headstock 2 and the tailstock 3 are so arranged as to hold the blank against longitudinal movement, the tool mechanism 4 being moved longitudinally along the blank in the manner to be presently set forth. When the machine is so constructed, the headstock 2 is fixedly secured to the bed, preferably being formed in part integrally therewith, as shown. The tailstock 3 is adjustable along the bed to accommodate blanks or blank arbors of different lengths.

The headstock 2 is provided with a rotatable spindle 5 mounted in bearings 6 and 7. Secured to the spindle is a collet chuck 8 which may be of any usual or preferred form and which is adapted to grip either the shank of the tool to be formed and relieved or an arbor upon which the tool is mounted. As illustrated, there is a blank A mounted upon an arbor B, the arbor being engaged by the chuck 8. For rotating the spindle 5 there is provided a drive mechanism including a driving member in the form of a worm wheel 9 meshing with a worm 10 on a transverse rotatable shaft 11.

The tailstock 3 may be of any usual or preferred construction, and it is adjustable along ways 12 and 13. It can be secured in adjusted position by means of a clamp 14 controlled by a lever 15. The tailstock spindle is indicated at 16 and carries a center 17. The spindle can be moved longitudinally by means of a screw 18 under the control of a hand wheel 19. For clamping the sleeve in adjusted position there is provided a handle 20. As shown, the center 17 is adjusted into engagement with the end of the arbor B.

The tool mechanism 4 includes a carriage 21 which is longitudinally movable along ways 22 and 23 on the bed 1. Mounted for transverse movement with respect to the carriage 21 is a slide 24, this slide carrying the cutting tool. In most of the figures of the drawings I have shown a non-rotary lathe tool 25, and such a tool is preferable for many classes of work. However, the invention is not limited to a non-rotary tool and when preferred a rotary tool can be used, as will presently be explained. The tool 25 is preferably very narrow.

As stated at the outset, the invention is adapted for cutting a blank having a varying diameter. The diameter may vary uniformly from end to end of the blank, thus providing a uniform taper, or it may vary in any desired way so as to provide the blank with any predetermined contour differing from a straight line. The variations in the diameter of the blank are determined by moving the slide 24 together with the tool transversely, and preferably, for regulating and controlling the transverse movements, I provide a former and a former pin, one carried in fixed position on the bed 1, and the other carried by the slide 24. As illustrated, there is provided a former 26 carried by the bed and a former pin 27 carried by the slide 24. The former 26 has exactly the same contour with which the blank is to be formed and the former pin 27 has exactly the same shape as the cutting tool 25. The pin is detachably secured to the slide so that it can be removed and another pin be substituted corresponding to a tool differing in shape from the tool 25 which is shown. For supporting the former 26 there is provided a bracket 28 rigidly secured to the bed 1. In order to permit adjustment, the former 26 is secured to a slide 29 which is longitudinally movable along a suitable guideway 30 on the bracket, a screw 31 being provided for effecting longitudinal movement. The slide can be locked in adjusted position by means of screws 32, 32 engaging a gib 33. To permit the ready attachment of the former, the slide 29 is provided with a T-slot 34 adapted to receive T-bolts 35 passing through the former. To further assist in holding the former in place and to prevent any possible free movement thereof, there is provided a hooked bolt 36 which, when tightened, serves to draw the former back against a suitable shoulder on the slide. In practice, a former 26 is selected having the contour with which the blank A is to be formed and then by means of the slide 29 the former is adjusted longitudinally until it bears the same relation to the former pin 27 that the blank A bears to the tool 25. When the former pin and the tool are exactly opposite, the former is adjusted to a position exactly opposite the blank. As the carriage is moved longitudinally the slide 24 with the tool 25 is moved transversely so as to keep the former pin 27 in engagement with the former.

In order that the tool may be given a relieving movement to properly relieve the several teeth on the blank, it is not rigidly secured to the slide 24 but is transversely movable thereon. Mounted on the slide 24 is a slide 37 which is transversely movable along a suitable guideway. Carried in part by the slide 24 is a mechanism for effecting regular reciprocating relieving movements of the slide 37 and the tool in suitable timed relation with the rotative movement of the blank. In order that the tool may be adjusted for blanks of different sizes, there is provided a tool-carrying slide 38 transversely movable on the slide 37. For moving the slide 38 there is provided a screw 39 rotatable by means of a hand wheel 40. The slide 38 is provided with a transverse T-slot 41 and a tool post 42 is held in place by means of T-bolts 43 entering the slot. The tool post has a tool-receiving aperture provided with a horizontal top wall 44 exactly at the level of the axis of the blank. The tool 25 is put in place with its top surface engaging the horizontal wall 44 of the tool post and is held in this position by means of a wedge 45.

It will be observed that with the construction described the tool is maintained in parallelism as it moves longitudinally for feeding or inward and outward to follow the contour.

The relieving mechanism for moving the slide 37 together with the tool 25 includes a rotatable relieving cam 46 which is mounted on the slide 24 so as to be bodily movable therewith. As shown, the cam is mounted on a longitudinal rotatable shaft 47 mounted in bearings 48 and 49 on a bracket 50 depending at the front of the slide 24. A lever 51 is pivoted between its ends on the slide 24 and at its lower end is provided with a roller engaging the cam 46. The upper end of the lever engages an abutment 52 on the slide 37. A coil spring 53 is interposed between the slide 37 and the slide 24, this spring tending to press the slide 37 forward, thus holding the abutment 52 in firm contact with the upper end of the lever 51. It will be seen that when the cam 46 is rotated the lever 51 will be oscillated, thus giving a reciprocating movement to the slide 37 and to the tool 25. The shape of the cam 46 is such that the slide 37 is moved forward relatively slowly at a uniform rate so that the tool may effect a relieving cut, and is then drawn back relatively rapidly so as to withdraw the tool and position it for another cut.

As before stated, the cam 46 is driven in timed relation with the blank rotation. For rotating the cam, I make use of the aforesaid transverse shaft 11. Positioned immediately below the shaft 11 is a shaft 54 which is mounted partly in the main frame and partly in a bracket 55 secured thereto. For connecting the two shafts 11 and 54 there is provided a gear 56 on the shaft 11, a gear 57 on the shaft 54 and an idler gear 58 meshing with the two gears 56 and 57. The idler gear is mounted on a bearing stud 59 carried by an adjustable slotted arm 60. The arm 60 is carried by a hub 61 which assists in supporting the shaft 11. The speed ratio between the two shafts 11 and 54 can be changed by removing one or both of the gears 56 and 57 and substituting other gears of different diameters, it being clear that the idler gear 58 can be adjusted to mesh with such differently diametered gears. Mounted in the said bracket 55 is a vertical shaft 62 and this shaft is driven from the shaft 54 by means of bevel gearing 63. By means of bevel gearing 64 the shaft 62 serves to drive a longitudinal splined shaft 65. This shaft is supported partly in a bearing 66 secured to the bed and partly in bearings 67 in a depending bracket 68 secured to the carriage 21.

Mounted on the shaft 65 between the bearings 67 and splined to the shaft, is a worm 69. This worm meshes with a worm wheel 70 which is connected with a transverse shaft 71. The worm wheel and the shaft are rotatably mounted in a bearing 72 formed in the bracket 68, and in a bearing 73 formed on a supplemental bracket 74 secured to the bracket 68. Slidably mounted on the shaft 71 is a bevel gear 75, and this gear is engaged by a bearing 76 on the aforesaid bracket 50 depending from the front end of the slide 24. The bevel gear 75 meshes with a bevel gear 77 on the shaft 47. The bevel gear 75 and the shaft 71 are splined or otherwise suitably constructed so that the bevel gear is rotated, but is at the same time free to move transversely of the machine when the slide 24 is moved. Inasmuch as the bevel gears 75 and 77 are both supported by the bracket 50, they are at all times held in mesh. It will be seen that with this construction power is transmitted from the shaft 11, through the several parts that have been described, to the shaft 65, and is transmitted from the shaft 65 to the shaft 47 and the cam 46, the connection between the shaft 65 and the shaft 47 being such that free transverse movement of the cam and associated parts is permitted. The cam 46 is given one complete rotation for each tooth of the blank. The machine can be adjusted for blanks with different numbers of teeth by changing the gears 56 and 57 as already explained.

As has already been stated, the machine is adapted for cutting blanks having helical teeth. In order that blanks with such teeth may be properly relieved, it is necessary to effect the relieving movements of the tool in peculiar relation to the rotative movement of the blank so that the relief may be in conformity with the helical teeth. I have stated that the relieving movements of the tool are effected in timed relation to the rotative movement of the blank; and, for any given position of the carriage, this timed relation is fixed and definite, but when the carriage is moved to bring the tool into a new cutting position, it is necessary to vary the relation between the relieving movements of the tool and the rotative movement of the blank. For this purpose I make use of a mechanism which is in many respects similar to that set forth in my aforesaid copending application Serial No. 201,338. The present construction differs, however, in that I have so arranged the mechanism that the aforesaid relationship is varied by changing the rotative movement of the blank rather than by changing the relieving movements of the tool. While I prefer to change the blank rotation, it will be understood that my present invention in its broader aspects is not limited in this respect.

In the construction illustrated, the driving member or worm wheel 9 is not connected directly with the spindle 5 but is connected indirectly by means of suitable gearing 78 which can be supplementally moved to change the spindle rotation. By preference, this gearing is bodily rotatable and includes a rack and pinion, the rack being longitudinally slidable in accordance with the longitudinal movements of the carriage 21. Coaxially mounted with the spindle 5 is a sleeve 79, this being supported in bearings 80 and 81 in the headstock. The inner end of the sleeve preferably extends into and has a bearing in the outer end of the spindle. Associated with the spindle is a frame 82 which is recessed to receive the outer end of the spindle and engage the outer surface thereof. The aforesaid worm wheel 9 is rigidly secured to the sleeve 79. Slidably mounted in the sleeve 79 is a shaft 83 having rack teeth formed thereon at 84. The shaft 83 is splined to the sleeve 79 so as to be rotatable therewith. Rotatably mounted in bearings in the frame 82 is a transverse shaft 85 provided with teeth 86 which meshes with the rack teeth 84. Also rotatably mounted in the frame 82 is a transverse shaft 87. The two shafts 85 and 87 are connected by spur gears 88 and 89. Also rotatably mounted in the frame 82 is a third rotatable shaft 90. Secured to this shaft is a worm 91 which meshes with worm teeth 92 formed in the periphery of the spindle 5 near the end thereof. At the side of the bracket 82 opposite from the gears 88 and 89 there is provided gearing for connecting the shafts 87 and 90. A gear 93 is mounted on the shaft 87, and a gear 94 is mounted on the shaft 90. An adjustable slotted bracket 95 is mounted on the frame 82 and this carries adjustable bearing studs 96 and 97 on which are mounted respectively idler gears 98 and 99.

Carried by the shaft 83 at the outer end thereof is an annularly grooved collar 100. Rigidly secured to the main frame adjacent the shaft 83 is a longitudinal guide stud 101. Slidably mounted on the stud 101 is a bracket 102 having a fork 103 entering the groove in the collar 100. The bracket 102 is apertured to receive a longitudinal rod 104, which is connected at its right-hand end with the carriage 21. The bracket 102 can be clamped to the rod 104 in any desired relative position, clamping being effected by means of screws 105, 105 provided with handles 106.

It will be seen that when the carriage 21 is moved longitudinally along the bed the rod 104, together with the bracket 102, will be moved at the same time and to the same extent. By reason of the engagement of the fork 103 with the collar 100 the shaft 83 is similarly moved, thus moving the rack teeth 84. When the rack slides longitudinally the pinion 86 is turned and this serves, by means of the gearing and the several shafts that have been described, to turn the worm 91. The rotative movement of the worm 91 serves to turn the spindle 5 relatively to the frame 82 and the sleeve 79. It will be understood, as before stated, that the entire gearing 78 rotates bodily with the sleeve 79. It will therefore be clear that the relative movement of the spindle with respect to the sleeve simply serves to either increase or decrease the spindle rotation to a certain extent. However, the relative movement of the spindle is determined by the longitudinal movement of the rack 84, which in turn is determined by the longitudinal movement of the carriage 21 and of the cutting tool 25 carried thereby. Inasmuch as the relieving cam reciprocates the tool with a frequency which is normally uniform, and inasmuch as the spindle and the blank are given a changed rotation which is in exact proportion to the longitudinal movement of the carriage and the tool, it is clear that the relieving movements are effected in such relation to the blank as to be in conformity with helical teeth.

The amount of variation of the spindle and blank rotation can be changed in accordance with the degree of inclination of the helical teeth by removing one or the other or both of the gears 93 and 94 and substituting other gears of different diameters. The idler gears 98 and 99 can be properly adjusted to mesh with such differently diametered gears. It is also possible to cause the relative movements of the spindle to take place in either direction in conformity with helical teeth inclined in either direction. As illustrated, the machine is adjusted for cutting teeth with left-hand helices. For cutting teeth with right-hand helices the idler gear 98 is removed and the gear 99 is adjusted to mesh directly with the gears 93 and 94. When it is desired to cut a blank with straight teeth instead of helical teeth, the gearing is rendered ineffective, as for instance by loosening the clamping screws 105, thus permitting the rod 104 to slide freely through the bracket 102. By loosening the clamping screws 105 it is possible to preliminarily adjust the carriage without affecting the position of the spindle and blank. When the cutter and the blank have been properly adjusted relatively, the handles 106 are turned to connect the carriage with the mechanism for controlling the spindle rotation.

In accordance with the present method the tool is fed intermittently as before stated, and it is withdrawn while being so fed. Preferably rotative movement of the blank is stopped during feeding and the timing is such that the tool is opposite a space between two teeth. The mechanism for effecting feeding movements and the other movements associated therewith will now be described in detail.

For moving the carriage longitudinally along the bed there is provided a screw 107 which engages a nut 108 carried by a bracket 109 depending from the carriage. The screw is supported at its left-hand end in a bearing 110 formed in a bracket 111 secured to the bed. Mounted in the bracket 111 is a transverse shaft 112 which is connected with the screw 107 by means of bevel gearing 113. At the front end of the shaft 112 is a hand wheel 114 by means of which the screw may be turned manually to move the carriage. In order that the carriage may be moved automatically to feed the tool from one cutting position to another, a suitable mechanism is provided. This mechanism is preferably adapted to feed the carriage intermittently, but it will be understood that as concerns certain phases of the invention I do not so limit myself inasmuch as the carriage may be moved continuously if desired. Mounted in the bracket 111 is a transverse bearing pin 115 upon which is rotatably mounted a sleeve 116. Loosely mounted on the sleeve near the inner end thereof is a gear 117 which meshes with a gear 118 on the shaft 112. Connected with this gear 117 is a ratchet wheel 119. Formed on the sleeve 116 near the outer end are gear teeth 120 which mesh with a gear 121 secured to the shaft 112. Keyed to the sleeve 116 is a ratchet wheel 122 similar to the ratchet wheel 119. Loosely mounted on the hub of the ratchet wheel 122 is a swinging arm 123. Pivotally connected with this arm near the lower end thereof is a link 124 which is adjustably connected at its left-hand end with an oscillating crank arm 125. The crank arm is secured to a transverse rock shaft 126 which is mounted in a bearing 127 and which carries at its rear end a lever 128. Carried by the lever at the upper end thereof is a roller 129 positioned to be engaged by a cam 130 on a longitudinal rotatable shaft 131. Mounted on the swinging arm 123 is a transverse pin 132 carrying two similar pawls 133 and 134 adapted respectively to engage the pawl wheels 119 and 122. Either ratchet can be thrown into or out of engagement with the corresponding wheel. The shaft 131 is rotated in the manner to be presently described, and it will be seen that at each rotation thereof the arm 128 and the crank arm 125 are oscillated. By means of the link 124 the oscillation of the crank arm 125 is transmitted to the plate 123, the extent of oscillation of the plate being adjustable by changing the connection between the link and the crank arm. By means of one or the other of the pawls 133 or 134, one of the ratchet wheels 119 or 122 is turned through a small angle, this turning the shaft 112 and the lead screw 107 and moving the carriage. It will be seen that the carriage movement is relatively great when the pawl 133 is in use, and is relatively small when the pawl 134 is in use. By selecting the proper pawl and by adjusting the crank arm connection the desired amount of carriage movement may be obtained.

Preferably the rotation of the spindle and of the blank is stopped during the feeding movement of the tool. I therefore provide two alternately acting mechanisms, one serving to rotate the spindle and the blank through one revolution, or approximately one revolution, and also serving to effect the relieving movements of the tool, and the other mechanism serving to effect the longitudinal feeding of the tool and preferably also serving to effect other movements to be described.

The mechanism for rotating the spindle and the blank has already been described in part, this mechanism including the transverse shaft 11, the worm 10 and the worm wheel 9. The machine is provided with a main power shaft 135 adapted to be driven in any suitable way, as for instance by means of a belt on a pulley 136. Rotatably mounted on the shaft 135 is a gear 137, this gear being connectible to the shaft by means of a splined clutch element 138. The gear 137 meshes with a gear 139 on a longitudinal shaft 140. Secured to the shaft 140 is a long gear 141, this gear being surrounded by a sleeve 142 which is open at the forward upper side. Slidably and rotatably mounted on the sleeve 142 is a bushing 143, this bushing 143 being provided with ears between which a gear 144 is rotatably mounted. This gear meshes with the aforesaid gear 141 on the shaft 140. A third longitudinal shaft 145 is provided, this shaft carrying a series of differently diametered gears 146. The shaft 145 is connected with the aforesaid shaft 11 by means of bevel gearing 147. The bushing 143 can be moved angularly and longitudinally on the bushing 142 so as to bring the gear 144 into mesh with any one of the differently diametered gears 146. A spring-pressed plunger 148 carried by the sleeve 143 is adapted to enter any one of a series of apertures in the sleeve 142 so as to hold the gear 144 in proper position to mesh with any desired one of the gears 146. It will be seen that by this construction the shaft 145 together with the shaft 11 can be driven from the shaft 135 at any one of a series of speeds.

Mounted in alinement with the main power shaft 135 is a short longitudinal shaft 149. The shaft 149 carries a clutch element which is adapted to be engaged by the aforesaid splined clutch element 138 on the shaft 135. When the clutch element is in its right-hand position as viewed in Fig. 4, it drives the gear 137 and the several parts connected therewith. When the clutch element is in its left-hand position it drives the shaft 149. A transverse shaft 150 is suitably mounted in bearings in the bed and this shaft is connected with the shaft 149 by means of bevel gearing 151. The shaft 150 carries a worm 152 which meshes with a worm wheel 153 on the aforesaid longitudinal shaft 131.

Figure 3:
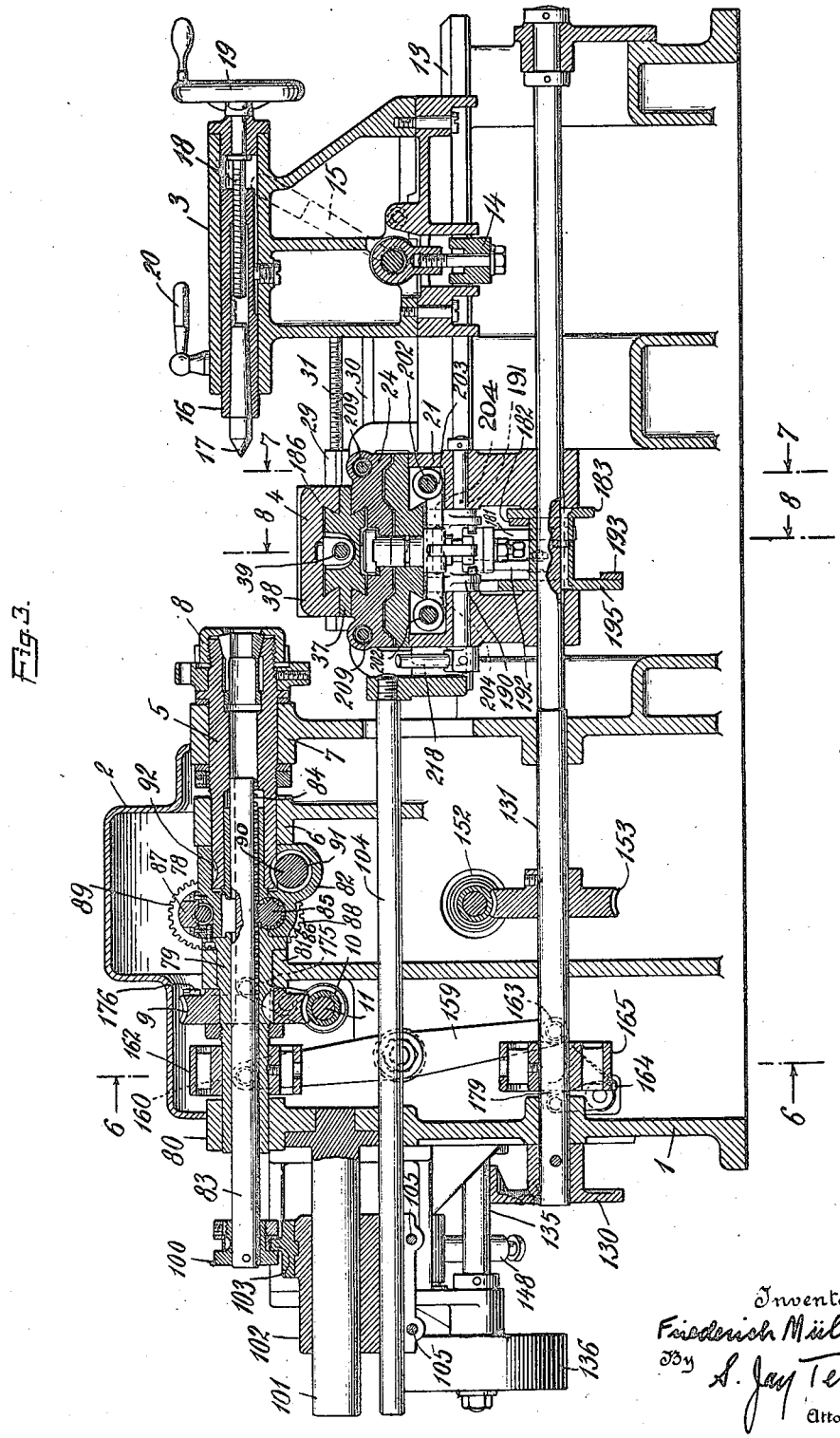
Fig. 3 is a vertical longitudinal sectional view.
Figure 4:
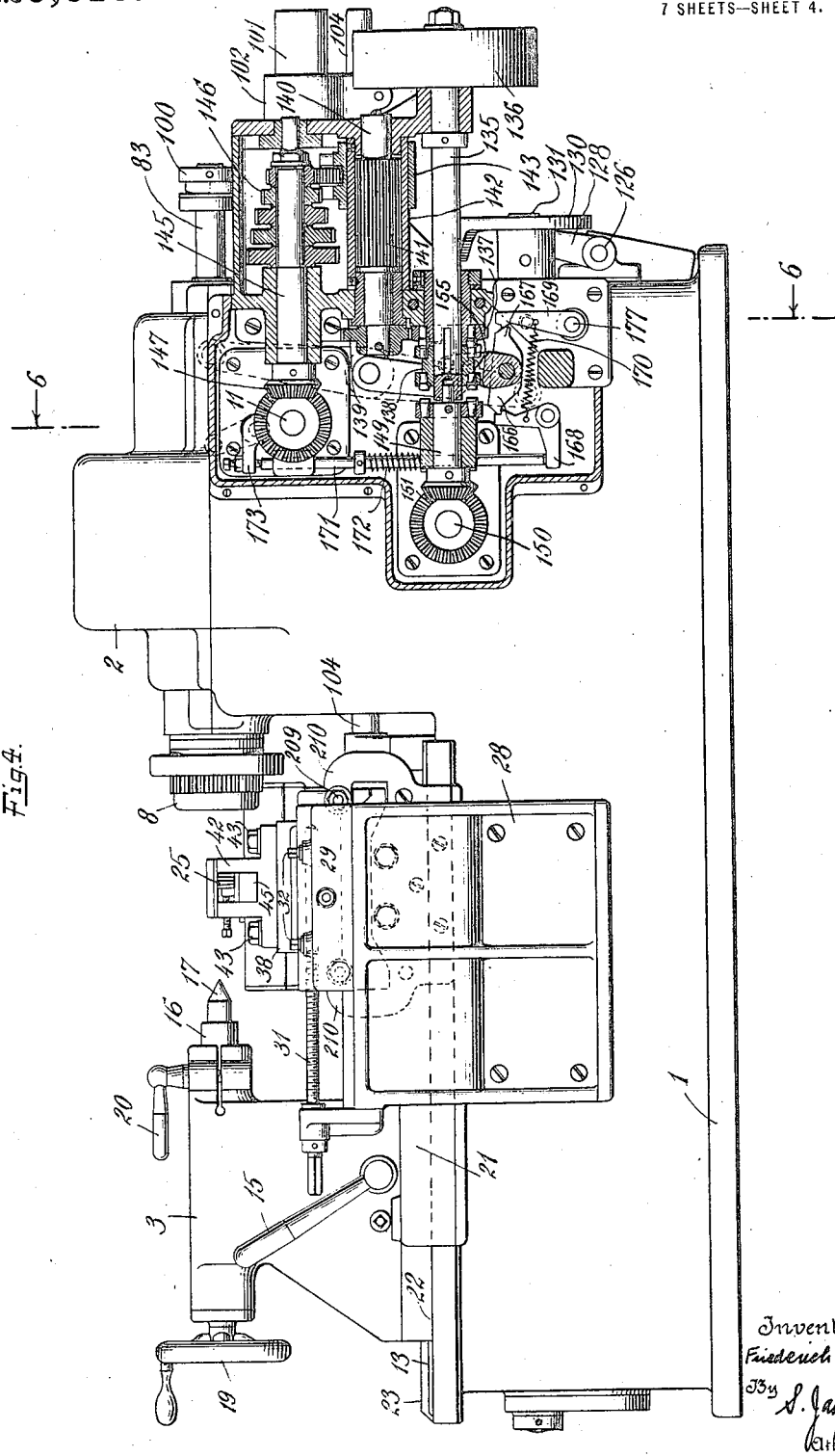
Fig. 4 is a rear view, partly in section, along the line 4—4 of Fig. 2.
Figure 5:
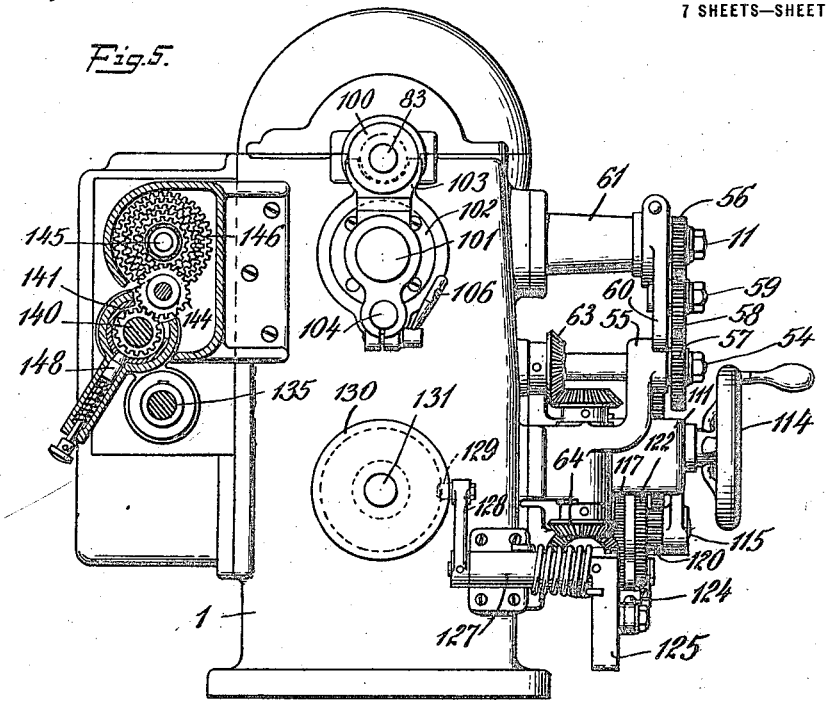
Fig. 5 is an end view taken from the left.
Figure 6:
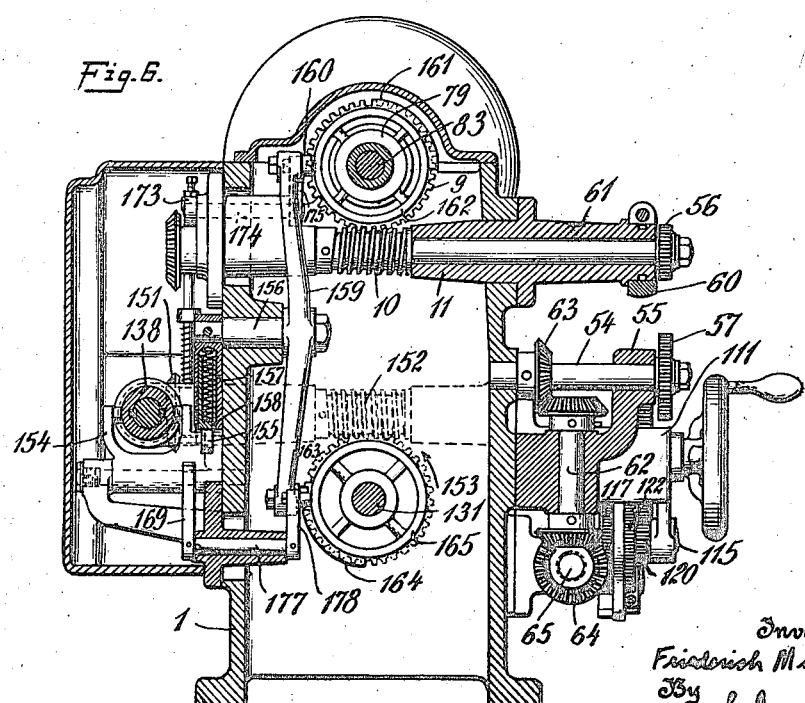
Fig. 6 is a transverse sectional view taken along the lines 6—6 of Figs. 1, 2, 3 and 4.
Figure 7:
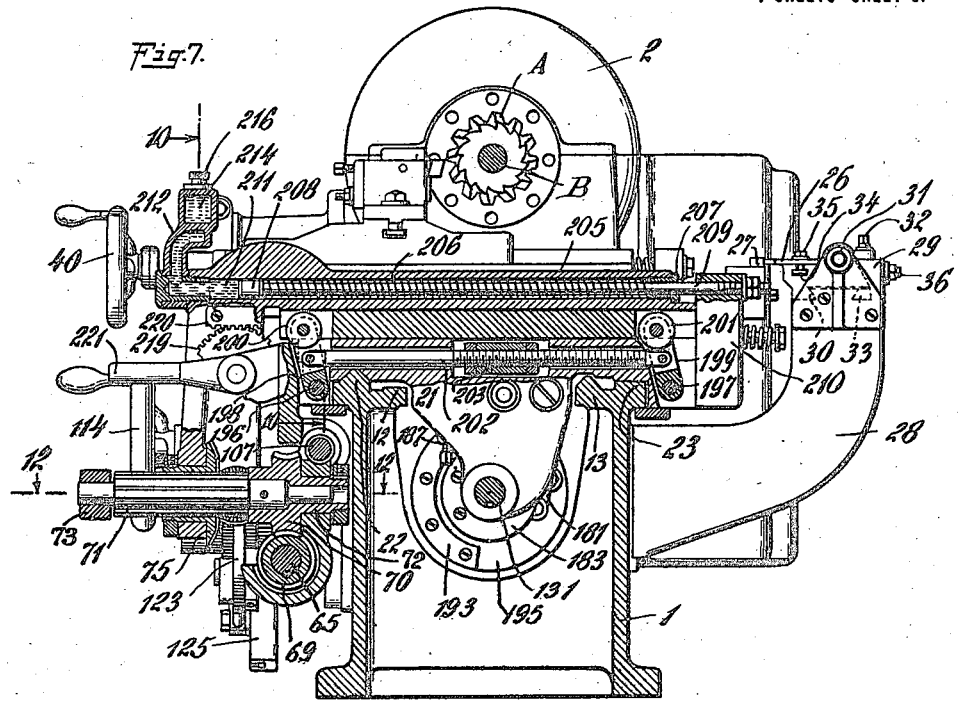
Fig. 7 is a transverse vertical sectional view taken along the lines 7—7 of Figs. 1, 2 and 3.

In the operation of the machine, it is desirable for the sleeve 79 and for the shaft 131 to each make one complete revolution alternately in succession. In order that the desired alternate movements of the sleeve and shaft may take place, I provide automatic mechanism for shifting the clutch element 138. The clutch element 138 is provided with an annular groove into which fit rollers or projections on a forked lever 154. This lever is transversely pivoted on the frame and is provided with a roller 155 by means of which it may be moved. Mounted in the frame above the forked lever 154 is a transverse rock shaft 156. This rock shaft carries at its rear end an arm 157 in which is mounted a spring-pressed plunger 158. As shown in Fig. 4, this plunger is V-shaped at its lower end and is adapted to engage the roller 155. Secured to the rock shaft 156 at the front end thereof is a lever 159 having upper and lower arms. The upper arm carries a roller 160 which is adapted to be engaged by a cam plate 161 secured to a cam drum 162 mounted on the sleeve 79. The lower arm of the lever 159 carries a roller 163 which is adapted to be engaged by a cam plate 164 secured to a cam drum 165 mounted on the shaft 131. When the parts are in the positions shown in Figs. 3, 4 and 6, the sleeve 79 is in motion and continues to turn until the cam plate 161 engages the roller 160 and turns the lever 159 in the clockwise direction, as viewed in Fig. 3, or in the counter-clockwise direction, as viewed in Fig. 4. This movement forces the spring-pressed plunger 158 over the top of the roller 155 and thus tends to swing the lever 154 in the direction to shift the clutch element into position to drive the shaft 149. When the shaft 149 is thus driven, the shaft 131 with the cam drum 165 thereon is driven in the direction indicated by the arrow in Fig. 6. This movement continues until the cam plate 164 engages the roller 163 and swings the lever 169 in the counter-clockwise direction, as viewed in Fig. 3, or in the clockwise direction, as viewed in Fig. 4. In other words, the cam plate 164 serves to restore the lever to the position which is shown in the drawings. The spring-pressed plunger 158 is again moved over the top of the roller 155 and tends to move the lever 154 in the direction to move the clutch element 138 into position to drive the gear 137.

Preferably, I do not depend solely upon the shifting of the lever 159 for the timing of the movements of the clutch element 138. As illustrated, the lever 154 is provided with opposite fingers 166 and 167 which are adapted to be engaged respectively by latches 168 and 169. These latches are held in engagement with the fingers by means of a spring 170. Referring to Fig. 4, it will be seen that the latch 168 serves to prevent the movement of the lever 154 toward the left even after the arm 157 has been moved to its right-hand position. Similarly, the latch 169 serves to prevent the movement of the lever 154 toward the right even after the arm 157 has been moved to its left-hand position. For releasing the latch 168 there is provided a vertically slidable rod 171 which is normally pressed upward by a spring 172. The upper end of the rod is engaged by an arm 173 on a short transverse rock shaft 174. This rock shaft carries at its front end a lever 175. Mounted on the lever is a roller adapted to be engaged by a cam projection 176 secured to the worm wheel 9. The cam projection 176 is so positioned with respect to the cam plate 161 that the plate first engages the roller 160 and moves the arm 157 into position to shift the lever 154. Subsequently, when the spindle 79 has completed the desired revolution, the cam projection 176 engages the roller on the lever 175, thus turning the rock shaft and the lever 173 and moving the rod 171 to release the latch 168. The latch having been released, the lever 154 turns under the action of the spring-pressed plunger 158 and disengages the clutch element from the gear 137 and engages it with the shaft 149. The latch 169 is mounted on a short transverse rock shaft 177 which carries at its front end a lever 178. At the upper end of the lever 178 is a roller which is positioned to be engaged by a cam projection 179 on the cam drum 165. The cam projection 179 is so positioned with respect to the main cam plate 164 that the plate first engages the roller 163 and moves the arm 158 into position to shift the lever 154. Subsequently, when the shaft 131 has completed the desired revolution, the cam projection 179 engages the roller and the lever 178, thus turning the rock shaft 177 to release the latch 169. The latch having been released, the lever 154 turns under the action of the spring-pressed plunger 158 and disengages the clutch element from the shaft 149 and engages it with the gear 137. It will be seen that by means of the mechanism described the spindle 79 serves to stop itself after making a complete revolution and to start the shaft 131. Similarly the shaft 131, after making one complete revolution, serves to stop itself and start the spindle 79. Thus these two parts operate alternately in continuous succession.

It is desirable to feed the tool longitudinally while out of engagement with the blank, that is, when the tool is opposite the groove between two teeth of the blank. The blank is therefore preferably mounted in the spindle so that at the position of stopping the tool will be opposite a groove. The grooves are helical but the spindle and the blank are supplementally turned at each longitudinal movement this supplemental turning exactly compensating for the inclination of the grooves and insuring the stopping of the blank with a groove opposite the tool.

Preferably the tool is withdrawn at the time of each longitudinal movement, the former pin also being withdrawn from engagement with the former. This withdrawal is affected by mechanism operated by the shaft 131, the withdrawal being thus properly timed with respect to the feeding movement. Associated with the slide 24 is an abutment 180 which is engaged by the upper end of a lever 181 longitudinally pivoted to the carriage 21. The lower end of the lever is provided with a roller which is adapted to be engaged by a cam plate 182 on a cam disk 183 secured to the shaft 131. At the beginning of the rotation of the shaft 131 the cam plate 182 engages the roller on the lever 181 and swings it in the counter-clockwise direction, thus moving the abutment 180 together with the slide 24 toward the front. In this way the tool 25 is withdrawn from the blank and the former pin 27 is withdrawn from the former 26. As the shaft 131 continues to rotate, the cam 130 operates the feeding mechanism in the way already described, and the carriage is moved longitudinally along the bed. After that the cam plate 182 permits the lever 181 to return to the position shown, and the slide 24 is permitted to move rearward carrying the tool 25 and the former pin 27 to their operative positions. It will be seen that by thus withdrawing the former pin from the former at the time of longitudinal movement, I avoid any difficulties incident to forcing the former pin along the former while in contact therewith. If the former pin were maintained in contact with the former at all times difficulty would be experienced in effecting the longitudinal movement, particularly at places where the contour of the former is sharply inclined.

Preferably the former pin is restored to engagement with the former by a relatively slow movement with a minimum of pressure, so that there will be no tendency to bend or distort the pin or to secure uneven contact between the pin and the former.

For this purpose I provide a mechanism for returning the carriage which is entirely independent in its operation from the mechanism for withdrawing it. The before mentioned abutment 180 is not connected directly to the slide 24 but is connected to a second slide 184 which is transversely movable independently of the first slide 24. Springs 185 are interposed between the slide 184 and the carriage 21 and these springs tend to move the slide 184 rearward, thus holding the abutment 180 at all times in engagement with the lever 181.

Figure 8:
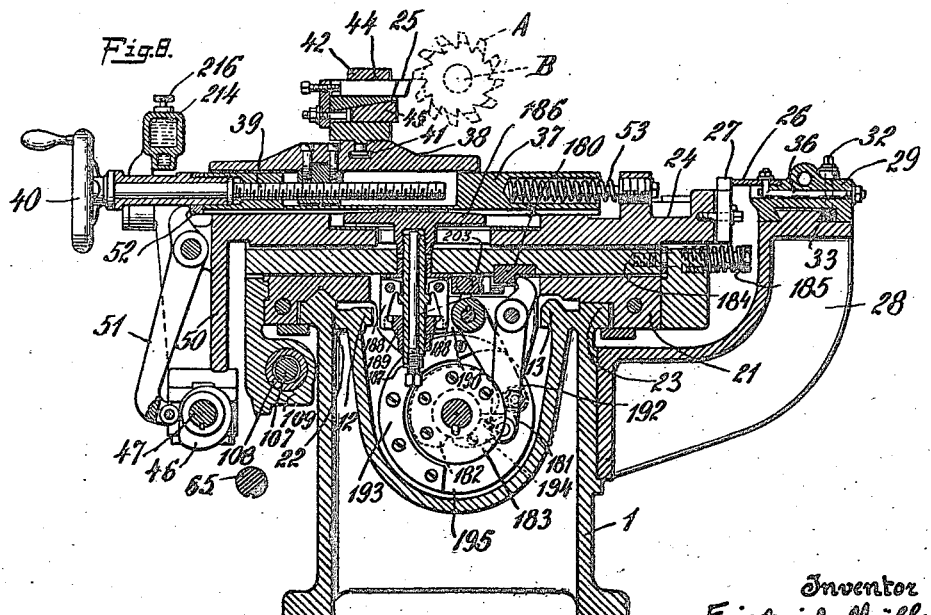
Fig. 8 is a transverse vertical sectional view taken along the lines 8—8 of Figs. 1, 2 and 3.

The two slides 24 and 184 are ordinarily connected by a lock. As shown most clearly in Figs. 3, 8 and 9, the lock includes a plate 186 located in a recess in the top of the slide 24. The plate is provided with a boss which projects downward through a slot in the slide, and threaded into this boss is a vertical stud 187. This stud extends through and closely fits an aperture in the slide 184. Pivoted to the slide 184 are two small bell-crank levers 188, these levers having horizontal upper arms which engage a collar on the stud 187. The lower ends of the levers are adapted to be engaged by a tapered cam bushing 189 vertically movable on the stud. When the bushing 189 is in its lower position, as shown, the levers 188 are forced outward, thus drawing the stud 187 downward and forcing the plate 186 into clamping engagement with the slide 24. In this way the slide 24 is firmly connected with the slide 184. When the bushing 189 is in its raised position, the levers 188 swing inward, thus permitting the stud 187 to move upward and release the plate 186 from its clamping engagement with the slide 24. For moving the bushing 189 there is provided a forked lever 190 having projections engaging slides or notches in the bushing. This lever is secured to a longitudinal rock shaft 191 mounted in bearings in the carriage 21. Connected with the lever 190 is a lever 192 having a roller which is adapted to be engaged by cam plates 193 and 194 secured to a cam disk 195 mounted on the shaft 131. It will be seen that as the shaft 131 rotates, the cam plate 193 engages the roller on the lever 192, thus moving the lever 190 and the cam bushing 189 upward and releasing the lock. Subsequently the roller is engaged by the cam plate 194, thus moving the cam bushing 189 downward and re-engaging the lock.

I have already stated that a supplemental mechanism is provided for returning the slide after it has been withdrawn in the way before described. Preferably, in order that this supplemental returning mechanism may operate without being affected in any way by the return movement of the slide 184, and in order further that the slide 24 may be returned with a minimum of effort, I provide a supplemental means for supporting the slide 24 after it has been unlocked from the slide 184. As illustrated, the carriage 21 is provided near its front and rear with transverse pivot pins 196 and 197. The carriage is slotted adjacent the pins, and in these slots are positioned arms 198 and 199 respectively pivoted on the said pins. The arms are respectively provided with rollers 200 and 201 which are adapted to engage the bottom of the slide 24. The arms are connected by pivoted links 202, and these links in turn are connected by a transverse yoke 203. The yoke 203 is provided with slots or notches in which fit pivot bosses 204 projecting upward from the lever 190. The result is that when the lever 190 is swung upward to release the lock, the arms 198 and 199 are swung in a clockwise direction, thus swinging the rollers 200 and 201 upward so as to lift the slide 24 off from the slide 184 and support it independently. The actual raising of the slide may be but a few thousandths of an inch. For returning the slide 24 rearward as soon as it has been released by the lock and elevated by the rollers, there are provided coil springs 205. Preferably, these springs are located in long transverse cylindrical apertures 206 in the slide 24. The springs abut at their rear ends against plugs 207 threaded into the apertures, and at their front ends abut against heads 208 on transverse rods 209. The rods 209 extend through central openings in the plugs 207 and are connected at their rear ends with brackets 210 on the carriage 21. Preferably the heads 208 are in the form of pistons and the forward parts of the apertures 206 constitute cylinders 211 in which the pistons 208 fit and move. Secured to the slide 24 is a casting 212 having a transverse passageway 213 which communicates at its ends with cylinders 211. Also formed in the casting 212 is a fluid reservoir 214. Leading from the passageway 213 into the reservoir 214 is a restricted aperture 215 which is preferably controlled by an adjustable needle valve 216. Leading from the reservoir 214 back to the passageway 213 is an automatic check valve 217. The cylinders 211 together with the passageway 213 and a part of the reservoir 214 are filled with a suitable fluid, which is preferably a liquid such as oil. It will be seen that as soon as the slide 21 has been elevated and released from the slide 184, the springs 206 tend to move it rearward. This tendency, however, is resisted by the engagement of the pistons 208 with the liquid in the cylinders. This engagement forces the liquid out of the cylinders into the passageway 213 and thence into the reservoir 214 through the restricted aperture 215. The liquid can pass through this aperture only relatively slowly, and thus the return movement of the slide is made to take place very slowly. When the slide is moved quickly forward at the time of next feeding, the check valve 217 opens to permit the liquid to flow from the reservoir 214 back to the passageway 213 and the cylinders 211. The slow return movement causes the former pin to engage the former gently and with a minimum force, so that there is little or no tendency to bend or deflect the parts.

It will be noted that the several cams 130, 182, 193 and 194 are so positioned in relation to each other that the operations which they respectively control take place in the following order. First the two slides 184 and 24 are moved backward in unison, they being still locked together. Then the slide 24 is unlocked from the slide 184 and is at the same time elevated on the rollers 200 and 201. At or about the same time the carriage is moved longitudinally to feed the tool to a new cutting position. Then the slide 184 is permitted to return to its normal position. In the meantime the slide 24 is being moved slowly rearward under the control of the springs 205 and the fluid regulating mechanism. After the completion of the return movement of the slide 24, the rollers 200 and 201 are lowered and the slide is again locked to the slide 184.

In order that the slide 24 may be manually released from the slide 184, I provide a lever 218 which is secured to the rock shaft 191. For moving the lever 218 there is provided a wrench 218ª as shown in Fig. 9. It will be seen that the operator, by moving the lever 218, can turn the rock shaft, thus raising the cam sleeve 189 and releasing the lock. For moving the slide 24 forward manually, there is provided a segmental gear 219 pivoted to the carriage and meshing with a rack 220 secured to the slide. Connected with the segmental gear 219 is a hand lever 221. It will be seen that by lowering or raising the handle the slide 24 can be moved forward or backward as desired.

It is believed that the general operation of the machine as followed in practicing the method will be clear from the foregoing description and that a very brief summary will suffice.

A former 26 is provided having the desired contour, and, in the case of an undercut cutter, having the desired relation to the cutter radius, as already explained. A blank is put in place, this blank having been previously grooved and roughed out in any usual or preferred manner. The gearing 78 is adjusted in accordance with the degree of inclination of the helical teeth on the blank and the gearing 56—57 is adjusted in accordance with the number of teeth on the blank. By means of the hand wheels 40 and 114, the tool is adjusted transversely and longitudinally into engagement with the blank at the right-hand end thereof. Then the machine is started, the spindle 79 and the operating shaft 131 operating alternately in succession. During the rotative movement of the blank relieving movements of the tool are effected as described, thus cutting the desired relief on the teeth of the blank. After one complete revolution of the blank the rotative movement of the spindle is stopped and also the relieving movements of the tool. The carriage is then fed longitudinally toward the left, the blank turning slightly in conformity with the helical teeth. Just prior to the longitudinal movement the tool slide is withdrawn, thus withdrawing the tool from the blank and the former pin from the former. After the longitudinal movement, the tool slide is moved slowly in the opposite direction, thus gently returning the former pin to the former which is engaged at a new position. The tool assumes a corresponding position with respect to the blank. After this movement of the tool and former pin the blank is again rotated through one revolution and these movements are repeated alternately in succession until the blank is completely formed.

What I claim is:

1. The herein described method which consists in axially rotating a blank, in providing a cutting tool in position to cut the blank, in effecting intermittent feeding movements between the tool and the blank longitudinally of the latter, in relatively moving the tool and the blank out of operative relation prior to each feeding movement, and in restoring the tool and the blank into operative relation after each feeding movement, the last said operative relation being so determined at each successive instance as to cut the blank with a varying diameter.

2. The herein described method which consists in axially rotating a blank having teeth inclined relative to the axis thereof, in providing a cutting tool in position to cut the blank, in effecting intermittent feeding movements between the tool and the blank longitudinally of the latter, in relatively moving the tool and the blank out of operative relation prior to each feeding movement, in restoring the tool and the blank into operative relation after each feeding movement, and in effecting relative movement between the blank and the tool to compensate for the inclination of the blank teeth relative to the axis of the blank.

3. The herein described method of cutting a milling cutter, which consists in axially rotating a blank having teeth inclined relative to the blank axis, in providing a cutting tool in position to cut the blank, in effecting feeding movement between the tool and the blank longitudinally of the latter, in moving the tool transversely to the blank to cut the blank to different diameters, in effecting relieving movements of the tool in timed relation to the blank rotation, and in varying the relation between the blank rotation and the relieving movements in accordance with the inclination of the blank teeth relative to the blank axis.

4. The herein described method of cutting a milling cutter having teeth inclined relative to the blank axis, which consists in axially rotating a blank, in providing a cutting tool in position to cut the blank, in effecting intermittent feeding movements between the tool and the blank longitudinally of the latter, in moving the tool transversely to the blank to cut the blank to different diameters, in effecting relieving movements of the tool in timed relation to the blank rotation, and in varying the relation between the blank rotation and the relieving movements in accordance with the inclination of the blank teeth relative to the blank axis.

5. The herein described method consisting in axially rotating a blank, in providing a cutting tool in position to cut the blank, in intermittently feeding the tool longitudinally of the blank, in withdrawing the tool from the blank prior to each feeding movement, and in restoring the tool to operative relation with the blank after each feeding movement, the last said operative relation being so determined at each successive instance as to cut the blank with a varying diameter.

6. The herein described method consisting in axially rotating a blank, in providing a cutting tool in position to cut the blank, in automatically feeding the tool intermittently longitudinally of the blank, in automatically withdrawing the tool from the blank prior to each feeding movement, and in automatically restoring the tool to operative relation with the blank after each feeding movement, the last said operative relation being so determined at each successive instance as to cut the blank with a varying diameter.

7. The herein described method consisting in axially rotating a blank, in providing a cutting tool in position to cut the blank, in intermittently feeding the tool longitudinally of the blank, in withdrawing the tool from the blank prior to each feeding movement, and in restoring the tool to operative relation with the blank after each feeding movement, the last said operative relation being determined in each successive instance in accordance with a predetermined non-rectilinear contour to which the blank is to be shaped.

8. The herein described method which consists in axially rotating a blank, in providing a cutting tool in position to cut the blank, in effecting intermittent feeding movements between the tool and the blank longitudinally of the latter, in relatively moving the tool and the blank out of operative relation prior to each feeding movement, and in restoring the tool and the blank into operative relation after each feeding movement, the last said operative relation being determined in each successive instance in accordance with a predetermined non-rectilinear contour to which the blank is to be shaped.

9. The herein described method consisting in axially rotating a blank, in providing a cutting tool in position to cut the blank, in automatically feeding the tool intermittently longitudinally of the blank, in automatically withdrawing the tool from the blank prior to each feeding movement, and in automatically restoring the tool to operative relation with the blank after each feeding movement, the last said operative relation being determined in each successive instance in accordance with a predetermined non-rectilinear contour to which the blank is to be shaped.

10. The herein described method consisting in axially rotating a blank, in providing a cutting tool in position to cut the blank, in providing a former having a predetermined non-rectilinear contour in accordance with which the blank is to be shaped, in providing a former pin connected with the tool and normally engaging the former, in intermittently feeding the tool and the pin longitudinally of the blank and the former, in withdrawing the tool from the blank and the pin from the former prior to each feeding movement, and in restoring the tool to operative relation with the blank and the pin to engagement with the former after each feeding movement.

11. The herein described method which consists in rotating a blank, in providing a cutting tool in position to cut the blank, in providing a former having a predetermined contour in accordance with which the blank is to be shaped, in providing a former pin associated with the tool and normally engaging the former, in effecting intermittent feeding movements between the tool and pin and the blank longitudinally of the latter, in relatively moving the tool and the blank out of operative relation and also the pin and the former out of operative relation prior to each feeding movement, and in restoring the tool and the blank into operative relation and also the pin and the former into operative relation after each feeding movement.

12. The herein described method consisting in axially rotating a blank, in providing a cutting tool in position to cut the blank, in providing a former having a predetermined non-rectilinear contour in accordance with which the blank is to be shaped, in providing a former pin connected with the tool and normally engaging the former, in automatically feeding the tool and the pin intermittently longitudinally of the blank and the former, in automatically withdrawing the tool from the blank and the pin from the former prior to each feeding movement, and in automatically restoring the tool to operative relation with the blank and the pin to engagement with the former after each feeding movement.

13. The herein described method of cutting a relieved milling cutter, the method consisting in axially rotating a blank, in providing a cutting tool in position to cut the blank, in intermittently feeding the tool longitudinally of the blank, in withdrawing the tool from the blank prior to each feeding movement, in restoring the tool to operative relation with the blank after each feeding movement, the last said operative relation being so determined at each successive instance as to cut the blank with a varying diameter, and in reciprocating the tool at all operative positions thereof in timed relation to the rotation of the blank to provide the required relief.

14. The herein described method of shaping a relieved milling cutter, the method consisting in axially rotating a blank, in providing a cutting tool in position to cut the blank, in providing a former having a predetermined non-rectilinear contour in accordance with which the blank is to be shaped, in providing a former pin connected with the tool and normally engaging the former, in intermittently feeding the tool and the pin longitudinally of the blank and the former, in withdrawing the tool from the blank and the pin from the former prior to each feeding movement, in restoring the tool to operative relation with the blank and the pin to engagement with the former after each feeding movement, and in reciprocating the tool at all operative positions thereof in timed relation to the rotation of the blank to provide the required relief.

15. The herein described method of cutting a relieved milling cutter having helicoidal cutting faces, the method consisting in axially rotating a blank having grooves therein formed with helicoidal faces, in providing a cutting tool in position to cut the blank, in intermittently feeding the tool longitudinally of the blank, in withdrawing the tool from the blank prior to each feeding movement, in restoring the tool to operative relation with the blank after each feeding movement, the last said operative relation being so determined at each successive instance as to cut the blank with a varying diameter, in reciprocating the tool at all operative positions thereof in timed relation to the rotation of the blank to provide the required relief, and in varying the timed relation between the rotative movement of the blank and the relieving movements of the tool in accordance with the feeding movements, thereby following the helicoidal cutting faces.

16. The herein described method of cutting a relieved milling cutter which consists in rotating a blank, in providing a cutting tool in position to cut the blank, in effecting intermittent feeding movements between the tool and the blank longitudinally of the latter, in relatively moving the tool and the blank out of operative relation prior to each feeding movement, in restoring the tool and the blank into operative relation after each feeding movement, the last said operative relation being so determined at each successive instance as to cut the blank with a varying diameter, and in reciprocating the tool in timed relation to the rotation of the blank to provide the required relief.

17. The herein described method which consists in rotating a blank, in providing a cutting tool in position to cut the blank, in providing a former having a predetermined contour in accordance with which the blank is to be shaped, in providing a former pin associated with the tool and normally engaging the former, in effecting intermittent feeding movements between the tool and pin and the blank longitudinally of the latter, in relatively moving the tool and the blank out of operative relation and also the pin and the former out of operative relation prior to each feeding movement, in restoring the tool and the blank into operative relation and also the pin and the former into operative relation after each feeding movement, and in reciprocating the tool in timed relation to the rotation of the blank to provide the required relief.

18. The herein described method of cutting a relieved milling cutter which consists in rotating a blank, in providing a cutting tool in position to cut the blank, in effecting intermittent feeding movements between the tool and the blank longitudinally of the latter, in relatively moving the tool and the blank out of operative relation prior to each feeding movement, in restoring the tool and the blank into operative relation after each feeding movement, the last said operative relation being so determined at each successive instance as to cut the blank with a varying diameter, in reciprocating the tool in timed relation to the rotation of the blank to provide the required relief, and in varying the timed relation between the rotative movement of the blank and the relieving movements of the tool in accordance with the feeding movements, thereby following the helicoidal cutting faces.

19. The herein described method of cutting a milling cutter which consists in axially rotating a blank having grooves therein inclined with respect to the blank axis to form teeth, in providing a cutting tool in position to cut the blank, in effecting feeding movement between the tool and the blank longitudinally of the latter, in effecting transverse movements of the tool relative to the blank, and in varying the rotative movement of the blank in accordance with the longitudinal feeding movement to maintain the tool in a predetermined relation relative to the blank teeth.

20. The herein described method of cutting a milling cutter, which consists in axially rotating a blank having grooves therein inclined with respect to the blank axis to form teeth, in providing a cutting tool in position to cut the blank, in effecting intermittent feeding movements between the tool and the blank longitudinally of the latter, in effecting transverse movement of the tool relative to the blank, and in varying the rotative movement of the blank for each feeding movement to maintain the tool in a predetermined relation relative to the blank teeth.

21. The herein described method of cutting a milling cutter, which consists in axially rotating a blank having grooves therein inclined with respect to the blank axis to form teeth, in providing a cutting tool in position to cut the blank, in effecting feeding movement between the tool and the blank longitudinally of the latter, in effecting transverse movement of the tool relative to the blank, in effecting relieving movements of the tool in timed relation to the blank rotation, and in varying the rotative movement of the blank in accordance with the longitudinal feeding movement to maintain the tool in a predetermined relation relative to the blank teeth.

22. The herein described method of cutting a milling cutter, which consists in axially rotating a blank having grooves therein inclined with respect to the blank axis to form teeth, in providing a cutting tool in position to cut the blank, in effecting intermittent feeding movements between the tool and the blank longitudinally of the latter, in effecting transverse movement of the tool relative to the blank, in effecting relieving movements of the tool in timed relation to the blank rotation, and in varying the rotative movement of the blank for each feeding movement to maintain the tool in a predetermined relation relative to the blank teeth.

23. The herein described method of shaping a relieved milling cutter having helicoidal cutting faces, the method consisting in axially rotating a blank having grooves therein formed with helicoidal faces, in providing a cutting tool in position to cut the blank, in providing a former having a predetermined non-rectilinear contour in accordance with which the blank is to be shaped, in providing a former pin connected with the tool and normally engaging the former, in intermittently feeding the tool and the pin longitudinally of the blank and the former, in withdrawing the tool from the blank and the pin from the former prior to each feeding movement, in restoring the tool to operative relation with the blank and the pin to engagement with the former after each feeding movement, in reciprocating the tool at all operative positions thereof in timed relation to the rotation of the blank to provide the required relief, and in varying the timed relation between the rotative movement of the blank and the relieving movements of the tool in accordance with the feeding movements, thereby following the helicoidal cutting faces.

24. The herein described method of cutting a milling cutter, the method consisting in axially rotating a blank having a series of generally longitudinal grooves therein, in providing a cutting tool in position to cut the blank, in intermittently feeding the tool longitudinally of the blank, in withdrawing the tool from the blank prior to each feeding movement, and in restoring the tool to operative relation with the blank after each feeding movement, the aforesaid withdrawing, feeding and restoring movements being effected while one of the aforesaid grooves in the blank is opposite the tool.

25. The herein described method of shaping a milling cutter, the method consisting in axially rotating a blank having a series of generally longitudinal grooves therein, in providing a cutting tool in position to cut the blank, in providing a former having a predetermined non-rectilinear contour in accordance with which the blank is to be shaped, in providing a former pin connected with the tool and normally engaging the former, in intermittently feeding the tool and the pin longitudinally of the blank and the former, in withdrawing the tool from the blank and the pin from the former prior to each feeding movement, and in restoring the tool to operative relation with the blank and the pin to engagement with the former after each feeding movement, the aforesaid withdrawing, feeding and restoring movements being effected while one of the aforesaid grooves in the blank is opposite the tool.

26. The herein described method of cutting a milling cutter, the method consisting in providing a rotatable blank having a series of generally longitudinal grooves therein, in providing a cutting tool in position to cut the blank, in repeatedly rotating the blank through a single revolution or approximately a single revolution and stopping it after each revolution with one of the grooves opposite the tool, in feeding the tool longitudinally of the blank at each stopping thereof, in withdrawing the tool from the blank prior to each feeding movement, and in restoring the tool to operative relation with the blank after each feeding movement.

27. The herein described method of cutting a milling cutter which consists in rotating a blank having a series of generally longitudinal grooves therein, in providing a cutting tool in position to cut the blank, in effecting intermittent feeding movements between the tool and the blank longitudinally of the latter, in relatively moving the tool and the blank out of operative relation prior to each feeding movement, and in restoring the tool and the blank to operative relation after each feeding movement, the aforesaid feeding movements being effected while one of the aforesaid grooves in the blank is opposite the tool.

28. The herein described method of cutting a milling cutter which consists in providing a blank having a series of generally longitudinal grooves therein, in providing a cutting tool in position to cut the blank, in repeatedly rotating the blank through approximately a single revolution and stopping it after each revolution with one of the grooves opposite the tool, in effecting feeding movement between the tool and the blank longitudinally of the blank at each stopping thereof, in relatively moving the tool and the blank out of operative relation prior to each feeding movement, and in restoring the tool and the blank to operative relation after each feeding movement.

29. The method of shaping a milling-cutter blank having helical teeth provided with helicoidal cutting faces which consists in rotating the blank, in providing a cutting tool in operative relation to the blank, in effecting intermittent feeding movements between the tool and the blank longitudinally of the latter, in stopping the blank rotation at the time of each feeding movement with one of the helical grooves opposite the tool, and in moving the tool inward and outward as longitudinal movement takes place to cut the blank with different diameters.

30. The method of shaping a milling-cutter blank having helical teeth provided with helicoidal cutting faces which consists in rotating the blank, in providing a cutting tool in operative relation to the blank, in effecting intermittent feeding movements between the tool and the blank longitudinally of the latter, in stopping the blank rotation at the time of each feeding movement with one of the helical grooves opposite the tool, in moving the tool inward and outward as longitudinal movement takes place to cut the blank with different diameters, and in effecting relieving movements of the tool in timed relation to the blank rotation.

31. The herein described method of shaping a milling cutter, the method consisting in providing a rotatable blank having a series of generally longitudinal grooves therein, in providing a cutting tool in position to cut the blank, in repeatedly rotating the blank through a single revolution or approximately a single revolution and stopping it after each revolution with one of the grooves opposite the tool, in providing a former having a predetermined non-rectilinear contour in accordance with which the blank is to be shaped, in providing a former pin connected with the tool and normally engaging the former, in feeding the tool and the pin longitudinally of the blank and the former at each stopping of the blank, in withdrawing the tool from the blank and the pin from the former prior to each feeding movement, and in restoring the tool to operative relation with the blank and the pin to engagement with the former after each feeding movement.

32. The herein described method of cutting a milling cutter having helicoidal cutting faces, the method consisting in axially rotating a blank having a series of helical grooves therein formed with helicoidal faces, in providing a cutting tool in position to cut the blank, in intermittently feeding the tool longitudinally of the blank, in withdrawing the tool from the blank prior to each feeding movement, and in restoring the tool to operative relation with the blank after each feeding movement, the aforesaid withdrawing, feeding and restoring movements, being effected while one of the aforesaid helical grooves in the blank is opposite the tool.

33. The herein described method of shaping a milling cutter having helicoidal cutting faces, the method consisting in axially rotating a blank having a series of helical grooves therein formed with helicoidal faces, in providing a cutting tool in position to cut the blank, in providing a former having a predetermined non-rectilinear contour in accordance with which the blank is to be shaped, in providing a former pin connected with the tool and normally engaging the former, in intermittently feeding the tool and the pin longitudinally of the blank and the former, in withdrawing the tool from the blank and the pin from the former prior to each feeding movement, and in restoring the tool to operative relation with the blank and the pin to engagement with the former after each feeding movement, the aforesaid withdrawing, feeding and restoring movements being effected while one of the aforesaid grooves in the blank is opposite the tool.

34. The herein described method of cutting a milling cutter having helicoidal cutting faces, the method consisting in axially rotating a blank having a series of helical grooves therein formed with helicoidal faces, in providing a cutting tool in position to cut the blank, in intermittently feeding the tool longitudinally of the blank, in withdrawing the tool from the blank prior to each feeding movement, in restoring the tool to operative relation with the blank after each feeding movement, the aforesaid withdrawing, feeding and restoring movements being effected while one of the aforesaid helical grooves in the blank is opposite the tool, and in reciprocating the tool at all operative positions thereof in timed relation to the rotation of the blank to provide the required relief.

35. The herein described method of shaping a milling cutter having helicoidal cutting faces, the method consisting in axially rotating a blank having a series of helical grooves therein formed with helicoidal faces, in providing a cutting tool in position to cut the blank, in providing a former having a predetermined non-rectilinear contour in accordance with which the blank is to be shaped, in providing a former pin connected with the tool and normally engaging the former, in intermittently feeding the tool and the pin longitudinally of the blank and the former, in withdrawing the tool from the blank and the pin from the former prior to each feeding movement, in restoring the tool to operative relation with the blank and the pin to engagement with the former after each feeding movement, the aforesaid withdrawing, feeding and restoring movements being effected while one of the aforesaid grooves in the blank is opposite the tool, and in reciprocating the tool at all operative positions thereof in timed relation to the rotation of the blank to provide the required relief.

36. The herein described method of cutting a milling cutter having helicoidal cutting faces, the method consisting in providing a rotatable blank having a series of helical grooves therein formed with helicoidal faces, in providing a cutting tool in position to cut the blank, in repeatedly rotating the blank through approximately a single revolution and stopping it after each revolution with one of the helical grooves opposite the tool, in feeding the tool longitudinally of the blank at each stopping thereof, in withdrawing the tool from the blank prior to each feeding movement, and in restoring the tool to operative relation with the blank after each feeding movement.

37. The herein described method of shaping a milling cutter having helicoidal cutting faces, the method consisting in providing a rotatable blank having a series of helical grooves therein provided with helicoidal faces, in providing a cutting tool in position to cut the blank, in repeatedly rotating the blank through approximately a single revolution and stopping it after each revolution with one of the helical grooves opposite the tool, in providing a former having a predetermined non-rectilinear contour in accordance with which the blank is to be shaped, in providing a former pin connected with the tool and normally engaging the former, in feeding the tool and the pin longitudinally of the blank and the former at each stopping of the blank, in withdrawing the tool from the blank and the pin from the former prior to each feeding movement, and in restoring the tool to operative relation with the blank and the pin to engagement with the former after each feeding movement.

38. The herein described method of cutting a milling cutter which consists in rotating a blank having a series of grooves inclined with respect to the axis thereof, in providing a cutting tool in position to cut the blank, in effecting intermittent feeding movements between the tool and the blank longitudinally of the latter, in relatively moving the tool and the blank out of operative relation prior to each feeding movement, and in restoring the tool and the blank into operative relation after each feeding movement, the aforesaid feeding movements being effected while one of the aforesaid grooves is opposite the tool.

39. The herein described method of cutting a milling cutter having helicoidal cutting faces, which consists in axially rotating a blank having a series of helical grooves therein formed with helicoidal faces, in providing a cutting tool in position to cut the blank, in effecting intermittent feeding movements between the tool and the blank, in relatively moving the tool and the blank out of operative relation prior to each feeding movement, in restoring the tool and the blank into operative relation after each feeding movement, the aforesaid feeding movements taking place when one of the aforesaid helical grooves in the blank is opposite the tool, and in reciprocating the tool in timed relation to the blank rotation to provide the required relief.

40. The herein described method of cutting a milling cutter having helicoidal cutting faces, which consists in providing a rotatable blank having a series of helical grooves therein formed with helicoidal faces, in providing a cutting tool in position to cut the blank, in repeatedly rotating the blank through approximately a single revolution and stopping it after each revolution with one of the helical grooves opposite the tool, in effecting feeding movement between the tool and the blank longitudinally of the blank at each stopping thereof, in relatively moving the tool and the blank out of operative relation prior to each feeding movement, and in restoring the tool and the blank to operative relation after each feeding movement.

41. The herein described method of cutting a milling cutter having helicoidal cutting faces, the method consisting in providing a rotatable blank having a series of helical grooves therein formed with helicoidal faces, in providing a cutting tool in position to cut the blank, in repeatedly rotating the blank through approximately a single revolution and stopping it after each revolution with one of the helical grooves opposite the tool, in feeding the tool longitudinally of the blank at each stopping thereof, in supplementally turning the blank at each feeding movement to maintain the helical groove opposite the tool, in withdrawing the tool from the blank prior to each feeding movement, and in restoring the tool to operative relation with the blank after each feeding movement.

42. The herein described method of shaping a milling cutter having helicoidal cutting faces, the method consisting in providing a rotatable blank having a series of helical grooves therein provided with helicoidal faces, in providing a cutting tool in position to cut the blank, in repeatedly rotating the blank through approximately a single revolution and stopping it after each revolution with one of the helical grooves opposite the tool, in providing a former having a predetermined non-rectilinear contour in accordance with which the blank is to be shaped, in providing a former pin connected with the tool and normally engaging the former, in feeding the tool and the pin longitudinally of the blank and the former at each stopping of the blank, in supplementally turning the blank at each feeding movement to maintain the helical grooves opposite the tool, in withdrawing the tool from the blank and the pin from the former prior to each feeding movement, and in restoring the tool to operative relation with the blank and the pin to engagement with the former after each feeding movement.

43. The herein described method of cutting a milling cutter having helicoidal cutting faces, the method consisting in providing a rotatable blank having a series of helical grooves therein formed with helicoidal faces, in providing a cutting tool in position to cut the blank, in repeatedly rotating the blank through approximately a single revolution and stopping it after each revolution with one of the helical grooves opposite the tool, in feeding the tool longitudinally of the blank at each stopping thereof, in supplementally turning the blank at each feeding movement to maintain the helical groove opposite the tool, in withdrawing the tool from the blank prior to each feeding movement, in restoring the tool to operative relation with the blank after each feeding movement, and in reciprocating the tool at all operative positions thereof in timed relation to the rotation of the blank to provide the required relief.

44. The herein described method of shaping a milling cutter having helicoidal cutting faces, the method consisting in providing a rotatable blank having a series of helical grooves therein provided with helicoidal faces, in providing a cutting tool in position to cut the blank, in repeatedly rotating the blank through approximately a single revolution and stopping it after each revolution with one of the helical grooves opposite the tool, in providing a former having a predetermined non-rectilinear contour in accordance with which the blank is to be shaped, in providing a former pin connected with the tool and normally engaging the former, in feeding the tool and the pin longitudinally of the blank and the former at each stopping of the blank, in supplementally turning the blank at each feeding movement to maintain the helical groove opposite the tool, in withdrawing the tool from the blank and the pin from the former prior to each feeding movement, in restoring the tool to operative relation with the blank and the pin to engagement with the former after each feeding movement, and in reciprocating the tool at all operative positions thereof in timed relation to the rotation of the blank to provide the required relief.

45. The method of shaping a milling-cutter blank having helical teeth provided with helicoidal cutting faces, which consists in rotating the blank, in effecting intermittent longitudinal feeding movements between the tool and the blank, in effecting transverse movements of the tool relative to the blank to cut the blank with different diameters, in reciprocating the tool in timed relation to the blank rotation to provide the necessary relief, and in varying the blank rotation relative to the relieving movements in accordance with the feeding movements, thereby following the helical teeth.

46. The method of shaping a milling-cutter blank having helical teeth provided with helicoidal cutting faces, which consists in effecting intermittent feeding movements between a cutting tool and the blank longitudinally of the latter, in effecting transverse movements between the tool and the blank to permit the feeding movements, in varying the transverse movements to cut the blank with different diameters, in effecting relieving movements between the tool and the blank in timed relation to the blank rotation, and in varying the blank rotation according to the helical teeth on the blank.

47. The method of shaping a milling-cutter blank which consists in rotating a blank having teeth inclined in either direction relative to the blank axis, in providing a cutting tool in position to engage the blank, in effecting feeding movements between the tool and the blank longitudinally of the latter, in effecting relieving movements of the tool at a normally uniform frequency, and in advancing or retarding the blank rotation relatively to the uniform relieving movements in conformity to either right-hand or left-hand helical teeth on the blank.

48. The method of shaping a milling-cutter blank having helical teeth, which consists in rotating the blank, in guiding a cutting tool in accordance with a former to cut the blank with different diameters, in effecting intermittent feeding movements between the tool and the blank, in reciprocating the tool in timed relation to the rotation of the blank to provide the required relief on the helical teeth, and in varying the timed relation between the rotative movement of the blank and the relieving movements of the tool in accordance with the feeding movements, thereby following the helical teeth.

49. The method of shaping a milling-cutter blank having helical teeth provided with helicoidal cutting faces which consists in rotating the blank, in effecting intermittent feeding movements between the tool and the blank longitudinally of the latter, in withdrawing the tool from operative relation with the blank at the time of each longitudinal feeding movement, in giving the blank a small movement of rotation at the time of each feeding movement to compensate for the helical teeth, in returning the tool into operative relation to the blank after each feeding movement, and in effecting relieving movements of the tool in timed relation to the blank rotation.

50. The method of shaping a milling-cutter blank which consists in rotating a blank, in effecting intermittent feeding movements between a cutting tool and the blank longitudinally of the latter, in stopping the blank rotation with the cutting tool opposite one of the grooves in the blank, in withdrawing the tool from operative relation with the blank prior to each feeding movement, in returning the blank and tool into operative relation at a relatively slow rate after each feeding movement, and in effecting relieving movements of the tool in timed relation to the blank rotation.

51. The method of shaping a milling-cutter blank having longitudinal grooves therein inclined with respect to the blank axis, which consists in rotating the blank, in providing a cutting tool in operative relation to the blank, in effecting relieving movements of the cutting tool in timed relation to the blank rotation, in effecting intermittent feeding movements between the tool and the blank, in withdrawing the cutting tool from operative relation to the blank prior to each feeding movement, in giving the blank a small movement of rotation according to the inclination of the grooves in the blank, and in returning the tool into operative relation to the blank at a relatively slow rate after each feeding movement.

52. The method of shaping a milling-cutter blank having helical teeth provided with helicoidal cutting faces which consists in rotating the cutter blank, in providing a cutting tool in operative relation to the blank, in effecting intermittent feeding movements between the tool and the blank longitudinally of the latter, in withdrawing the tool from operative relation to the blank prior to each feeding movement, in returning the tool into operative relation at a relatively slow rate after each feeding movement, and in varying the blank rotation in accordance with the feeding movements to compensate for the inclination of the blank teeth relative to the axis thereof.

53. The method of shaping a milling-cutter blank having helical teeth provided with helicoidal cutting faces which consists in rotating the blank, in providing a cutting tool in operative relation to the blank, in effecting intermittent feeding movements of a carriage carrying the cutting tool, in withdrawing the tool from operative relation to the blank at the time of each longitudinal feeding movement, in returning the tool into operative relation with a blank after each feeding movement, in locking the tool to the carriage after each return movement, and in unlocking the tool from the carriage prior to each withdrawing movement.

54. The method of shaping a milling-cutter blank having helical teeth provided with helicoidal cutting faces which consists in rotating the blank, in providing a cutting tool in operative relation to the blank, in effecting intermittent feeding movements of a carriage carrying the cutting tool, in withdrawing the tool from operative relation to the blank at the time of each longitudinal feeding movement, in returning the tool into operative relation with a blank after each feeding movement, in locking the tool to the carriage after each return movement, in unlocking the tool from the carriage prior to each withdrawing movement, and in effecting relieving movements of the tool in timed relation to the blank rotation.

In testimony whereof, I hereto affix my signature.

FRIEDERICH MÜLLER.